United States Patent
Krall

(10) Patent No.: US 6,444,908 B1
(45) Date of Patent: Sep. 3, 2002

(54) APPARATUS HAVING A CABLE GROMMET OF UNIFORM FLEXIBILITY

(75) Inventor: Hans Peter Krall, Klagenfurt (AT)

(73) Assignee: Koninklijke Philips Electronics, N.V., Eindhoven (NL)

(*) Notice: Subject to any disclaimer, the term of this patent is extended or adjusted under 35 U.S.C. 154(b) by 0 days.

(21) Appl. No.: 09/893,042

(22) Filed: Jun. 27, 2001

(51) Int. Cl.[7] .................................................. H02G 3/18
(52) U.S. Cl. .............................. 174/65 G; 174/152 G; 174/153 G; 16/2.1; 248/56
(58) Field of Search ..................... 174/65 G, 152 G, 174/153 G, 65 R, 65 SS, 151, 135; 16/2.1, 2.2; 248/56; 439/604, 31 R; 277/606

(56) References Cited

U.S. PATENT DOCUMENTS 4,826,277 A  5/1989  Weber et al.
5,270,487 A * 12/1993 Sawamura ............ 174/65 G X
6,081,964 A * 7/2000 Mori ............................. 16/2.2
6,220,888 B1  4/2001  Correa
6,265,670 B1 * 7/2001 Duesterhoeft et al. .. 174/152 G

FOREIGN PATENT DOCUMENTS

DE  1490287  9/1962
EP  0375669 A2  6/1990

* cited by examiner

Primary Examiner—Anthony Dinkins
Assistant Examiner—Dhiru R Patel
(74) Attorney, Agent, or Firm—Ernestine C. Bartlett

(57) ABSTRACT

In apparatus (1) having a cable grommet (7) the cable grommet (7) is formed with grommet apertures (12, 13, 14) which are arranged after one another in a direction (15) towards the free end (11) of the cable grommet (7) and which have at least one aperture dimension which increases in the grommet direction (15).

10 Claims, 2 Drawing Sheets

APPARATUS HAVING A CABLE GROMMET OF UNIFORM FLEXIBILITY

FIELD OF THE INVENTION

The invention relates to an apparatus having a mains cable and having a housing lead-through through which the mains cable is passed, and having a cable grommet in the area of the housing lead-through, through which cable grommet the mains cable is passed. The cable grommet has a first grommet portion and a second grommet portion, of which two grommet portions the first grommet portion is attached to the housing in the area of the housing lead-through and is designed to have a comparatively low flexibility relative to the second grommet portion. The second grommet portion extends from the first grommet portion up to the free end of the cable grommet and is designed to have a comparatively high flexibility relative to the first grommet portion and is formed with grommet apertures in order to achieve the comparatively high flexibility, which grommet apertures are arranged after one another in a grommet direction which extends from the first grommet portion to the second grommet portion.

The invention further relates to a cable grommet having a first grommet portion and a second grommet portion, of which two grommet portions the first grommet portion is designed to be attached to a housing of an apparatus in the area of a housing lead-through of the housing and is designed to have a comparatively low flexibility relative to the second grommet portion. The second grommet portion extends from the first grommet portion up to the free end of the cable grommet and is designed to have a comparatively high flexibility relative to the first grommet portion and is formed with grommet apertures in order to achieve the comparatively high flexibility, which grommet apertures are arranged after one another in a grommet direction which extends from the first grommet portion to the second grommet portion.

BACKGROUND OF THE INVENTION

An apparatus of the type defined in the first paragraph and a grommet of the type defined in the second paragraph are known from the document DE 298 16 617 U1. In the known construction all the grommet apertures have the same aperture dimensions. When the known grommet is bent, as happens during use of the apparatus and in the case that the mains cord which is led through the grommet is wound around the housing of the apparatus, this results in a non-uniform bending in the second grommet portion, namely in such a manner that the radius of curvature increases comparatively strongly towards the free end of the grommet. As a result of this, the mains cord which is led through the grommet can be bent comparatively sharply in the area where it leaves the grommet, i.e. in the area of the free end of the grommet, which may comparatively soon lead to damage to the wires, the wire insulation and the cable sleeve of the mains cable.

SUMMARY OF THE INVENTION

It is an object of the invention to preclude the problems described hereinbefore and to provide an improved apparatus and an improved cable grommet.

According to the invention, in order to achieve the afore-mentioned object with an apparatus of the type defined in the first paragraph, the grommet apertures have at least one aperture dimension which increases in the grommet direction.

According to the invention, in order to achieve the afore-mentioned object with a cable grommet of the type defined in the second paragraph, the grommet apertures have at least one aperture dimension which increases in the grommet direction.

As a result of the provision of the measures in accordance with the invention, it is achieved, in a particularly simple manner and without any additional cost, because the formation of through-holes in accordance with the invention does not require any additional costs at all in comparison with the formation of through-holes in known manner, that during bending of the cable grommet in accordance with the invention a uniform bending occurs in the second grommet portion, i.e. a substantially constant radius of curvature is obtained in the second grommet portion, which precludes an excessive bending of the mains cable led through the cable grommet in the area of the free end of the cable grommet and consequently precludes adverse effects that may be caused by such excessive bending.

In an apparatus in accordance with the invention and in a cable grommet in accordance with the invention, grommet apertures of rectangular cross-sectional shape may be provided, which grommet apertures may have aperture dimensions in the grommet direction which, for example, increase parallel to the grommet direction. Alternatively, the aperture dimensions transverse to the grommet direction may also increase in the grommet direction. It has proved to be very advantageous when the grommet apertures have an increasing aperture cross-section, i.e. the aperture dimension increases both in a direction parallel to the grommet direction and in a direction transverse to the grommet direction.

In an apparatus in accordance with the invention and a cable grommet in accordance with the invention having grommet apertures of increasing aperture cross-sections, it has proved to be particularly advantageous when, in addition, the one or more of the following features are included: (a) the cable grommet has a substantially oval cross-sectional shape, and the grommet apertures are arranged in the four transitional portions between the longitudinal portions and the two apex portions of the substantially oval cross-sectional shape; (b) the grommet apertures have a funnel-like cross-sectional shape; (c) the grommet apertures are each bounded by a bounding wall which extends substantially parallel to the longitudinal portions and a second bounding wall which extends substantially perpendicularly to the longitudinal portions. Tests have shown that these embodiments are particularly advantageous.

The afore-mentioned as well as further aspects of the invention will be apparent from the example of an embodiment described hereinafter and will be elucidated with the aid of this example.

BRIEF DESCRIPTION OF THE DRAWINGS

The invention will now be described in more detail with reference to the drawings which show an embodiment given by way of example but to which the invention is not limited.

DETAILED DESCRIPTION OF PREFERRED EMBODIMENTS

Figure 1:
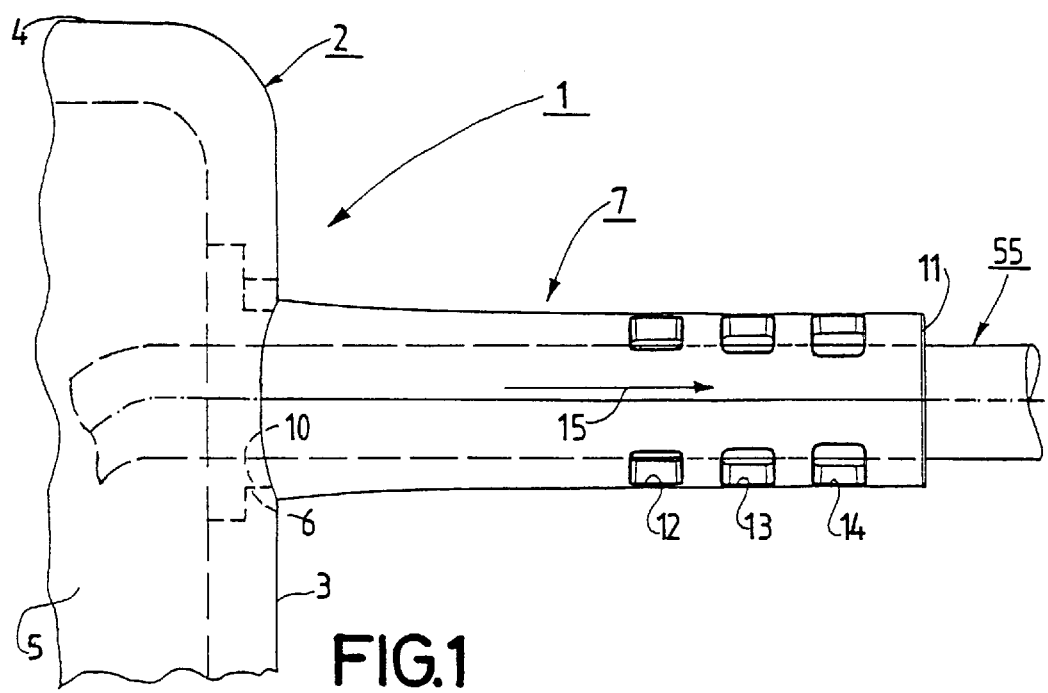
FIG. 1 is a side view of a part of an apparatus in accordance with the invention, which part includes a cable grommet in accordance with the invention.
Figure 2:
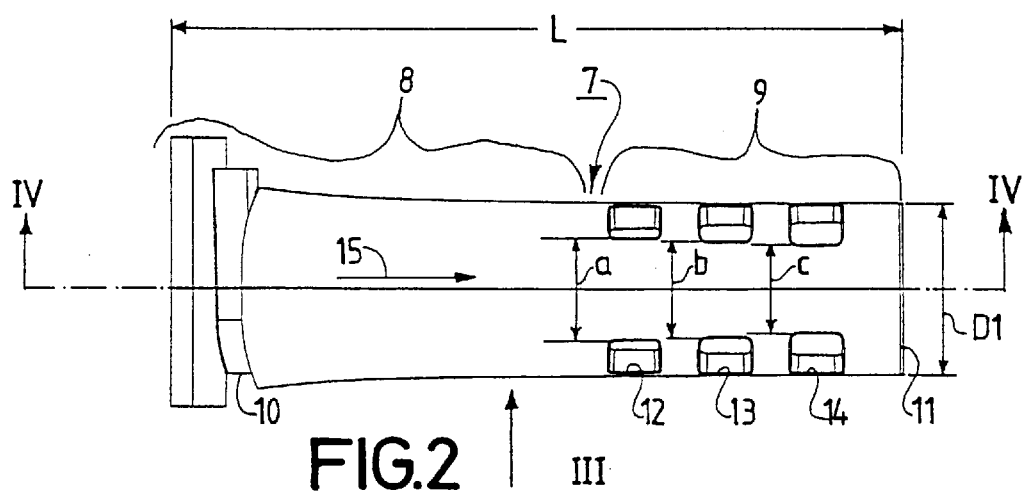
FIG. 2, similarly to FIG. 1, shows the cable grommet in accordance with the invention, connected to the apparatus shown in FIG. 1.
Figure 3:
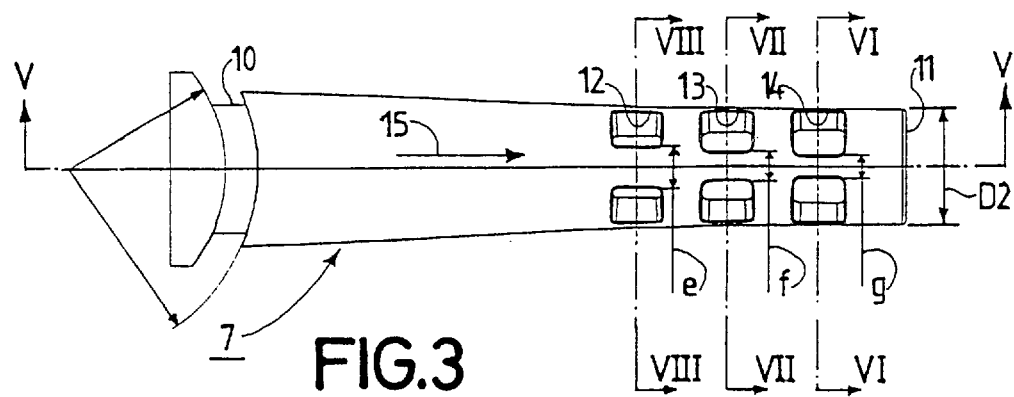
FIG. 3 shows the cable grommet shown in FIG. 2 in a view indicated by the arrow III in FIG. 2.
Figure 4:
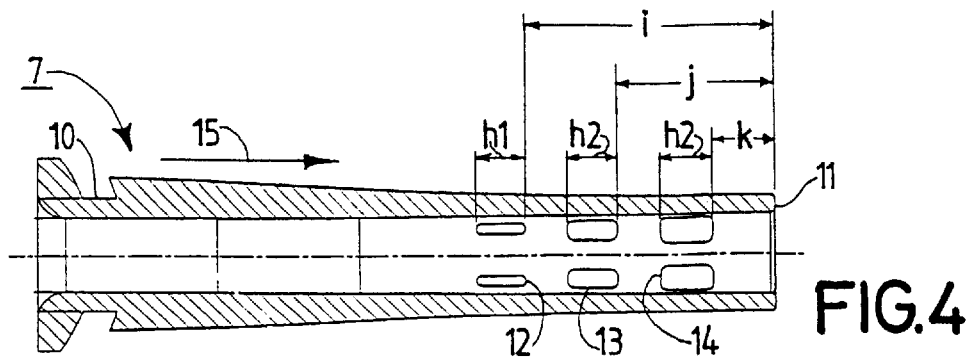
FIG. 4 shows the cable grommet of FIGS. 2 and 3 in a sectional view taken on the line IV—IV in FIG. 2.
Figure 5:
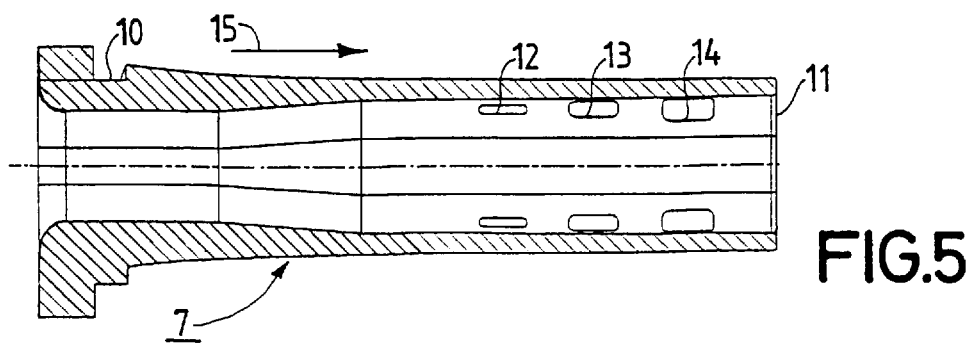
FIG. 5 shows the cable grommet of FIGS. 2, 3 and 4 in a sectional view taken on the line V—V in FIG. 3.

FIG. 1 shows a part of an apparatus 1. In the present case the apparatus is a so-called hand-held mixer. However, it may alternatively be any other mains-powered apparatus, for example a mincer or a small kitchen appliance or an iron or a knife grinder. The apparatus 1 has a mains cable 55. The apparatus 1 further has a housing 2, of which a bounding wall 3 and a bounding wall 4 as well as a bounding wall 5 are shown in FIG. 1. In the area of the bounding wall 3 the housing 2 has a housing lead-through 6, which has a stepped shape. The mains cable 55 is passed through the housing lead-through 6.

The apparatus 1 has a cable grommet 7 in the area of the housing lead-through 6. The mains cable 55 is passed through the cable grommet 7. The cable grommet 7 has a first grommet portion 8 and a second grommet portion 9, which two grommet portions 8 and 9 are each indicated by means of a brace.

The first grommet portion 8 of the two grommet portions 8 and 9 is adapted to be attached to the housing 2 of the apparatus 1 in the area of the housing lead-through 6 of the housing 2 and the first grommet portion 8 is thus attached to the housing 2 in the area of the housing lead-through 6. For this purpose, the first grommet portion 8 has a recess 10 which is engaged by a part of the stepped housing lead-through 6. The first grommet portion 8 has a comparatively low flexibility in relation to the second grommet portion 9, which is due to the fact that the first grommet portion 8 takes the form of a circumferentially fully closed tubular portion.

The second grommet portion 9 of the two grommet portions 8 and 9 projects from the first grommet portion 8 and extends from the first grommet portion 8 up to the free end 11 of the cable grommet 7. The second grommet portion 8 has a comparatively high flexibility relative to the first grommet portion 8. In order to obtain the comparatively high flexibility the second grommet portion 9 is formed with grommet apertures 12, 13 and 14. The grommet portions 12, 13 and 14 are arranged one after the other in a grommet direction 15 which extends from the first grommet portion 8 to the second grommet portion 9. The grommet direction 15 is indicated by an arrow 15 in FIGS. 1 to 5.

Figure 6:
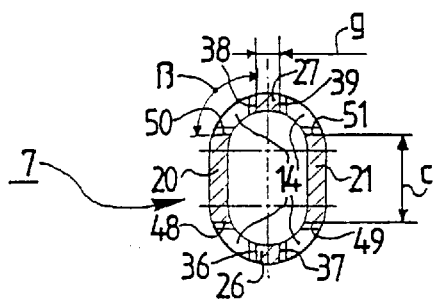
FIG. 6 shows the cable grommet of FIGS. 2 to 5 in a sectional view taken on the line VI—VI in FIG. 3.

In the apparatus 1 shown in FIG. 1 and in the cable grommet 7 of the apparatus 1, which cable grommet 7 is shown in detail in FIGS. 2 to 8, the grommet apertures 12, 13 and 14 advantageously have aperture diameters which increase in the grommet direction 15. In the present case the grommet apertures 12 have the height h1 in the grommet direction 15. The grommet apertures 13 and 14 have the same height h2 in the grommet direction 15, which height is greater than the height h1. The aperture diameters of the grommet apertures 12, 13 and 14 in the circumferential direction, i.e. transverse to the grommet direction 15, increases in the grommet direction 15, as is apparent from FIGS. 1 to 8 and as is clearly evident in particular from FIGS. 7 and 8, because the grommet apertures 14 shown in FIG. 6 are larger in the circumferential direction of the cable grommet 7 than the grommet apertures 13 and 12 and because the grommet apertures 13 in the circumferential direction of the cable grommet 7 are larger than the grommet apertures 12.

Figure 7:
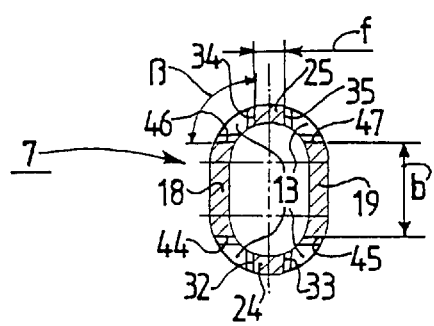
FIG. 7 shows the cable grommet of FIGS. 2 to 6 in a sectional view taken on the line VII—VII in FIG. 3.
Figure 8:
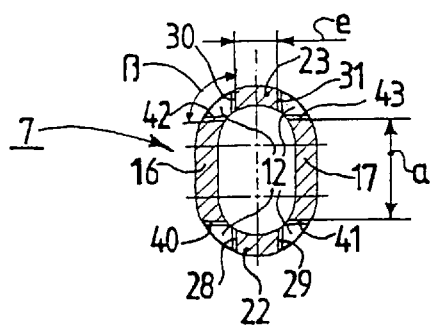
FIG. 8 shows the cable grommet of FIGS. 2 to 7 in a sectional view taken on the line VIII—VIII in FIG. 3.

As is clearly evident from FIGS. 6, 7 and 8, the cable grommet 7 has an oval cross-sectional shape. In this case, the construction is such that the grommet apertures 12, 13 and 14 are provided in the four transitional portions between the two longitudinal portions 16, 17; 18, 19 and 20, 21 and the two apex portions 22, 23; 24, 25 and 26, 27, respectively, of the substantially oval cross-sectional shape. In this case, the grommet apertures 12, 13 and 14 have funnel-like cross-sectional shapes. In the present case, the funnel-like cross-sectional shapes of the grommet apertures 12, 13 and 14 are realized in that the grommet apertures 12, 13 and 14 are bounded by respective bounding walls 28, 29, 30, 31; 32, 33, 34, 35 and 36, 37, 38, 39 which extend substantially parallel to the respective longitudinal portions 16, 17; 18, 19 and 20, 21 and by respective bounding walls 40, 41, 42, 43; 44, 45, 46, 47 and 48, 49, 50, 51 which extend substantially perpendicularly to the respective longitudinal portions 16, 17; 18, 19 and 20, 21. Said bounding walls extend at angles P relative to one another.

The shapes of the grommet apertures 12, 13 and 14 are obtained in that the grommet apertures 12, 13 and 14, as already stated, have aperture dimensions h1 and h2 in the grommet direction 15 and in that the respective longitudinal portions 16, 17; 18, 19 and 20, 21 situated between the grommet apertures 12, 13 and 14 have dimensions a, b and c, respectively, and the apex portions situated between the grommet apertures 12, 13 and 14 have dimensions e, f and g, respectively.

It is to be noted that there are four grommet apertures 12, four grommet apertures 13 and four grommet apertures 14 in total. The ends of the grommet apertures 12 facing the free end 11 of the cable grommet 7 have a distance i from the free end 11. Likewise, there is a distance j between the grommet apertures 13 and the free end 11. Similarly, there is a distance k between the grommet apertures 14 and the free end 11 of the cable grommet 7.

In a realized cable grommet 7 having an overall length L (see FIG. 2) and having outer dimensions D1 and D2 (see FIGS. 2 and 3), the values specified hereinafter have proved to be advantageous:

L=40.03 mm, D1=9.4 mm, D2=6.3 mm, a=4.9 mm, b=5.3 mm, c=5.7 mm, e=2.3 mm, f=1.7 mm, g=1.3 mm, h1=2.6 mm, h2=2.7 mm, i=13.5 mm, j=8.5 mm and k=3.4 mm.

In the exemplificative embodiment described hereinbefore the aperture dimensions of the grommet apertures 13 and 14 parallel to the grommet direction 15 are equal, i.e. they have the values h2. Obviously, the grommet apertures 14 may be dimensioned to be greater than the value h2. In the exemplificative embodiment described hereinbefore the grommet apertures 12, 13 and 14 have been provided in three different level zones. However, it is alternatively possible to provide more than three of such level zones, in which case again four grommet apertures, but also less or more than four grommet apertures, may be provided in each level zone. Furthermore, it is to be noted that alternatively apertures having other than funnel-like shapes are possible, for example apertures having substantially cylindrical shapes.

What is claimed is:

1. An apparatus having a mains cable and having a housing lead-through through which the mains cable is passed, and having a cable grommet in the area of the housing lead-through, through which cable grommet the mains cable is passed and which cable grommet has a first grommet portion and a second grommet portion, of which two grommet portions the first grommet portion is attached to the housing in the area of the housing lead-through and is designed to have a comparatively low flexibility relative to the second grommet portion and of which the second grommet portion extends from the first grommet portion up to the free end of the cable grommet and is designed to have a comparatively high flexibility relative to the first grommet portion and is formed with grommet apertures in order to achieve the comparatively high flexibility, which grommet apertures are arranged after one another in a grommet direction (15) which extends from the first grommet portion to the second grommet portion, characterized in that the grommet apertures have at least one aperture dimension (h1, h2) which increases in the grommet direction.

2. An apparatus as claimed in claim 1, characterized in that the grommet apertures have aperture cross-sections which increase in the grommet direction in that the grommet apertures have cross-sectional dimensions (h1, h2) which increase substantially parallel to the grommet direction and cross-sectional dimensions which increase substantially perpendicularly to the grommet direction.

3. An apparatus as claimed in claim 2, characterized in that the cable grommet has a substantially oval cross-sectional shape, and the grommet apertures are arranged in the four transitional portions between the longitudinal portions and the two apex portions of the substantially oval cross-sectional shape.

4. An apparatus as claimed in claim 3, characterized in that the grommet apertures have a funnel-like cross-sectional shape.

5. An apparatus as claimed in claim 4, characterized in that the grommet apertures are each bounded by a first bounding wall which extends substantially parallel to the longitudinal portions and a second bounding wall which extends substantially perpendicularly to the longitudinal portions.

6. A cable grommet having a first grommet portion and a second grommet portion, of which two grommet portions the first grommet portion is designed to be attached to a housing of an apparatus in the area of a housing lead-through of the housing and is designed to have a comparatively low flexibility relative to the second grommet portion and of which the second grommet portion extends from the first grommet portion up to the free end of the cable grommet and is designed to have a comparatively high flexibility relative to the first grommet portion and is formed with grommet apertures in order to achieve the comparatively high flexibility, which grommet apertures are arranged after one another in a grommet direction (15) which extends from the first grommet portion to the second grommet portion, characterized in that the grommet apertures have at least one aperture dimension (h1, h2) which increases in the grommet direction.

7. A cable grommet as claimed in claim 6, characterized in that the grommet apertures have aperture cross-sections which increase in the grommet direction in that the grommet apertures have cross-sectional dimensions (h1, h2) which increase substantially parallel to the grommet direction and cross-sectional dimensions which increase substantially perpendicularly to the grommet direction.

8. A cable grommet as claimed in claim 7, characterized in that the cable grommet has a substantially oval cross-sectional shape, and the grommet apertures are arranged in the four transitional portions between the longitudinal portions and the two apex portions of the substantially oval cross-sectional shape.

9. A cable grommet as claimed in claim 8, characterized in that the grommet apertures have a funnel-like cross-sectional shape.

10. A cable grommet as claimed in claim 9, characterized in that the grommet apertures are each bounded by a first bounding wall which extends substantially parallel to the longitudinal portions and a second bounding wall which extends substantially perpendicularly to the longitudinal portions.

* * * * *